United States Patent [19]
Adams et al.

[11] Patent Number: 5,680,670
[45] Date of Patent: Oct. 28, 1997

[54] CLEANING DEVICE FOR A POWDER COATING COMPARTMENT

[75] Inventors: Horst Adams, Nonnenhorn, Germany; Mario Hämmerle, Hohenems, Austria

[73] Assignee: Wagner International AG, Alstatten, Switzerland

[21] Appl. No.: 602,233

[22] Filed: Feb. 15, 1996

[30] Foreign Application Priority Data

Feb. 15, 1995 [DE] Germany .......... 195 05 101.7
Jun. 19, 1995 [DE] Germany .......... 195 22 186.9

[51] Int. Cl.$^6$ .................. B05B 5/02
[52] U.S. Cl. .......... 15/302; 15/304; 15/312.1
[58] Field of Search .......... 15/301, 304, 312.1, 15/302

[56] References Cited

U.S. PATENT DOCUMENTS

| | | | |
|---|---|---|---|
| 3,073,321 | 1/1963 | Lukas | 15/312.1 X |
| 3,167,797 | 2/1965 | Hergonson | 15/312.1 X |
| 3,571,840 | 3/1971 | Gleaton | 15/312.1 |
| 3,800,358 | 4/1974 | Ryan | 15/312.1 |
| 3,902,455 | 9/1975 | Lehmann et al. | |
| 4,622,713 | 11/1986 | Ohashi et al. | 15/301 X |
| 4,715,314 | 12/1987 | Ramseier et al. | |

FOREIGN PATENT DOCUMENTS

| | | |
|---|---|---|
| 2 219 040 | 10/1973 | Germany . |
| 24 30 517 | 2/1975 | Germany . |
| 35 16 826 | 11/1986 | Germany . |
| 39 41 927 | 5/1991 | Germany . |

*Primary Examiner*—Chris K. Moore
*Attorney, Agent, or Firm*—Hill, Steadman & Simpson

[57] ABSTRACT

A cleaning device for a powder coating compartment that comprises a tube system that can be moved back and forth under motor drive through the compartment with a conveyor that passes through a longitudinal slot in the compartment roof and that is equipped with nozzles through which compressed air can be blown against the compartment walls. The tube system comprises two tube branches that are respectively arranged at the contour of the compartment roof and the compartment side walls symmetrically relative to a longitudinal center plane; and in that the compartment floor not swept by the tube system is covered by a discharge belt for eliminating excess powder. The belt is cleaned by a belt cleaning mechanism.

18 Claims, 2 Drawing Sheets

CLEANING DEVICE FOR A POWDER COATING COMPARTMENT

BACKGROUND OF THE INVENTION

The invention is directed to a cleaning device for a powder coating compartment that is moveable through the compartment in a longitudinal direction and includes a tube system with nozzles via which cleaning air is blown against the compartment walls.

A known cleaning device of this species (DE 35 16 826 C2) is provided with a tube ferrule system having an upwardly open tube ferrule whose base also sweeps the compartment floor, so that it is not only the compartment roof and the compartment sidewalls but the compartment floor as well that are blown off with the nozzles using compressed air supplied in surges. A complete cleaning and, moreover, an elimination of an electrostatic charging of compartment walls composed of plastic can not be achieved by this device.

In a similar, known cleaning device (EP 0 200 681 B1) having an upwardly open tube ferrule, the floor of the compartment and the tube ferrule system are fashioned V-shaped, whereby the point of the V discharges into a central extraction channel for extracting the powder that has been blown off. Sponges can be additionally incorporated with the cleaning device in order to improve the cleaning effect (DE-B-39 41 927). The compartment floor however cannot be walked on due to the V-shaped fashioning thereof, thus making inspection and maintenance work more difficult.

SUMMARY OF THE INVENTION

It is an object of the invention to provide a cleaning device that is moveable through the compartment in a longitudinal direction and includes a tube system with nozzles via which cleaning air is blown against the compartment walls such that a good cleaning effect and accessibility of the compartment are assured.

The object is inventively achieved in that the tube system includes tube branches that extend essentially vertically and parallel to the side walls of the compartment and are equipped with nozzles, and the floor is equipped with a discharge belt running in the longitudinal direction of the compartment.

By contrast to the above-described Prior Art, the tube system of the invention is not annular but comprises two separate tube branches that do not sweep the floor of the compartment and can thus also not blow it free of excess powder. The planar, horizontally directed compartment floor is covered by a discharge belt for excess powder that is separately cleaned, for example blown off or wiped off, either at the end of the compartment or outside the compartment. The discharge belt can be walked on, so that inspection and maintenance work inside the compartment can be unproblematically implemented.

A wiper frame is provided to wipe off the side walls and the ceiling of the compartment in order to improve the cleaning effect further and to also eliminate potential electrostatic charges of the compartment walls. A wiper mechanism having water fed sponges can be provided which is extensible from a retracted idle position into an extended operating position arranged at a circumference of the wiper frame. The residues of the powder that have not been blown off and adhere to the roof and sidewalls of the compartment are wiped off wet (with water) with the wiper device provided in accord therewith, preferably given a return motion of the cleaning device; whereas the blow-off with the nozzles of the tube branches occurs during the chronologically earlier forward motion.

The wet wiping eliminates any and all electrostatic charging vie the water used for wiping, particularly given compartment walls advantageously composed of plastic.

Further advantageous developments of the invention include providing a separate cleaning device for the discharge belt, outside of the compartment. Also, slots can be provided which communicate with lateral extraction channels for recovering blown off powder, located at both sides of the discharge belt in the lower two corner regions of the compartment. The tube branches can be arranged in a common vertical plane and fashioned inverted L-shaped and having upper, horizontal legs suspended at two parallel plates of a conveyor means and which extend vertically through a longitudinal slot in the compartment ceiling. The tube branches can be supplied with compressed air via a common compressed air feed arranged at the conveyor means or at the frame.

Slanting surfaces lead from the side walls of the compartment to the slots and vertical legs of the tube branches are arranged above the slanting surfaces and are provided with nozzles directed onto the slanting surfaces.

The frame can be fashioned in the form of a prone C, whereby the free ends of its C-legs are attached to the plates of the conveyor means. The nozzles can be loctuatable during conveying through the compartment in one direction and the wiper mechanism is actuatable during conveying in a respective other direction. The cleaning mechanism for the discharge belt can be a nozzle arrangement for blowing the discharge belt off with compressed air at the discharge side of the compartment and a hingeable sponge at or before the admission side of the compartment.

The invention is explained in greater detail with further details of exemplary embodiments below with reference to schematic drawings.

DETAILED DESCRIPTION OF THE PREFERRED EMBODIMENTS

Figure 1:
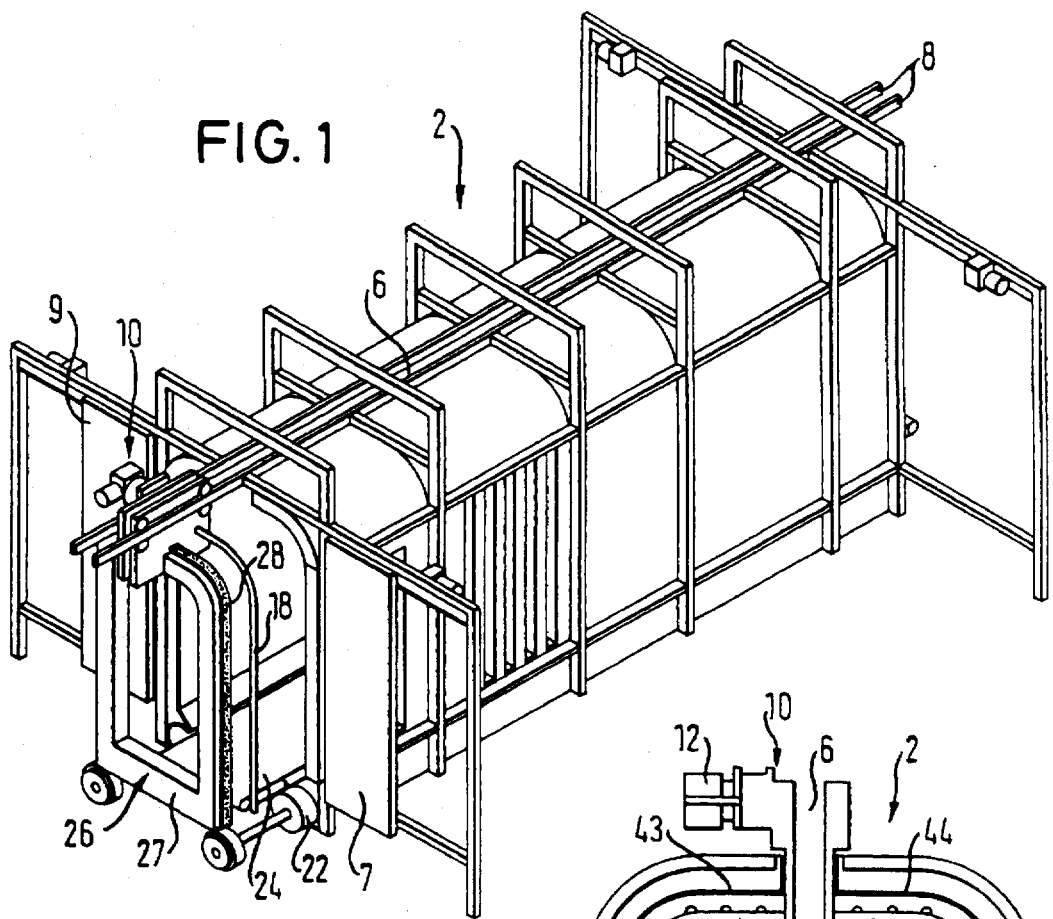
FIG. 1 is a perspective illustration of a powder coating compartment having the cleaning device of the invention located in front of it in waiting position.

An overall powder coating compartment 2 is illustrated in FIG. 1.

At least the inside wall 4 of the compartment is composed of electrically non-conductive plastic. The compartment is provided with a longitudinal slot 6 in the roof along which a conveyor means (referenced 10 overall) can be moved back and forth on rails 8 with an electromotive drive 12. The conveyor means 10 has two parallel, vertical plates 14 that project through the longitudinal slot 6 into the interior of the compartment 2.

Two L-shaped tube branches 16,18 of a tube system are secured to the plates 14. The tube branches 16,18 each respectively have a vertical, long leg 161,181 and a horizontal, upper, short leg 162,182. The tube branches 16,18 respectively have the free ends of their horizontal legs 162,182 secured such to the plates 14 lying opposite one another that the tube branches are arranged in a common plane that lies transversely relative to the longitudinal direction of the compartment 2.

The tube branches 16,18 are equipped with nozzles 163, 164 that are directed horizontally against the compartment sidewalls 41,42 in the region of the vertical, long legs; and are directed against the walls 43,44 of the compartment roof in the region of the short legs 162,182.

Vertically downwardly directed nozzles 165,166 are arranged at the lower ends of the long, vertical legs 161,181, these nozzles 165,166 being arranged above slanting surfaces 45,46 at the lower ends of the compartment sidewalls 41,42. These slanting surfaces discharge into slots 47,48 in extraction channels 20,22 arranged at both sides in the foot part of the compartment.

The compartment floor 23 itself is covered by a horizontal, endless discharge belt 24. A separate cleaning device (not shown) for this discharge belt comprises a nozzle arrangement at what is the right-hand end outside the compartment 2 in FIG 1 and comprises a hingeable sponge on the underside at what is the left-hand end in FIG. 1 in that region outside the compartment 2 where the tube branch 18 of the cleaning device is shown.

Figure 3:
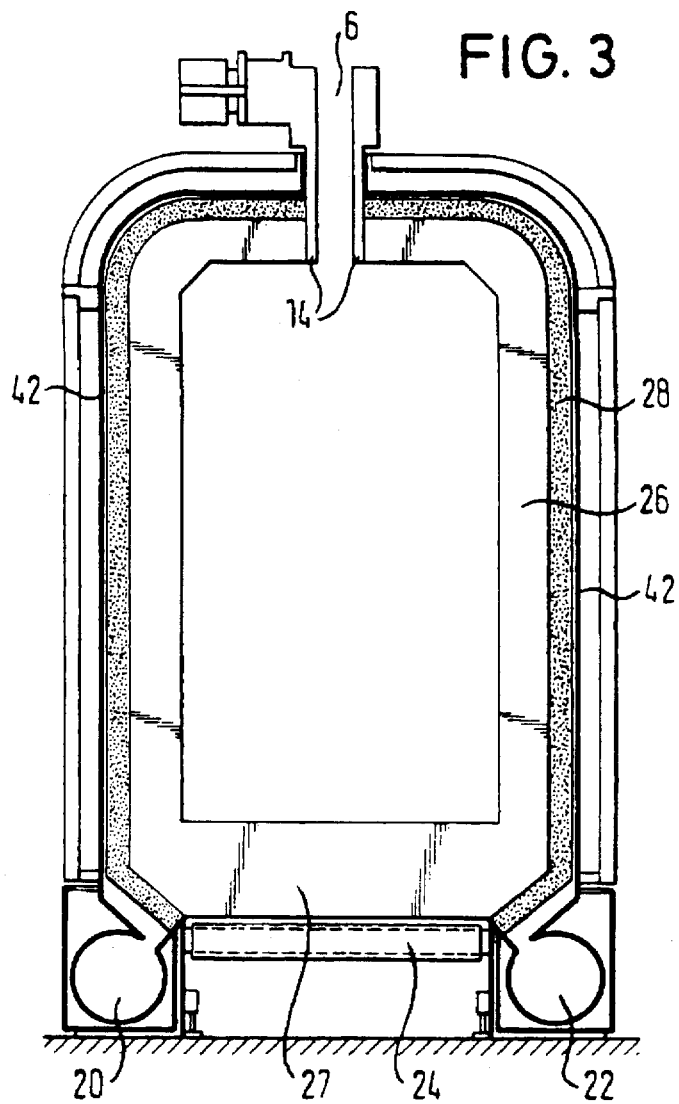
FIG. 3 is a cross section through the cleaning device according to FIG. 1 in a transverse plane at the level of a wiper frame.

Also belonging to the cleaning device in addition to the tube system comprising the tube branches 16,18 is a wiper frame 26 in the form of a prone "C" (FIGS. 1 and 3) that is secured to the plates 14 in a plane lying in front of and parallel to the plane of the tube branches 16,18 in the illustrated exemplary embodiment. A wiper mechanism 28 in the form of one or more extensible and retractable sponges that are saturated with water during operation is arranged at the circumference of this frame 26 (FIGS. 1 and 3).

In the illustrated exemplary embodiment, the compressed air delivery of the cleaning device described up to now can ensue via the conveyor means 10 with air hoses (not shown) or the like that are supplied by a compressed air source (not shown)

In an alternative embodiment wherein the tube branches 16,18 are integrated into the frame 26 for holding the extensible and retractable wiper mechanism 28, the compressed air delivery of the branches 16,18 can also be accommodated in the horizontal, lower web 27 of the frame 26.

During operation, workpieces that are sluiced through the compartment with the conveyor means 10 extending through the slot 6 in the compartment roof are coated by powder coating devices (not shown).

From time to time, i.e. not necessarily after every powdercoating, the clearing device together with the tube branches 16,18 and the wiper frame 26 is conveyed through the compartment with the conveyor means 10. Compressed air is thereby blown through the nozzles 163 through 166 of the tube branches 16,18, so that the compartment sidewalls 41,42 as well as the walls 43,44 of the compartment roof are blown with air to remove excess powder. The majority part of the powder adhering to these walls is thereby cleaned off and extracted along the slanting surfaces 45,46 through the slots 47,48 via the extraction channels 20,22 and is thus recovered for reemployment.

In order to complete the cleaning, the conveyor means 10 is now moved back through the compartment 2 in the opposite direction, whereby the compressed air feed for the nozzles 163–166 is shut off and, instead, the wiper mechanism 28 is extended from the frame 26 for wiping off the compartment sidewalls 41,42 and the compartment roof parts 43,44, and, for example, is supplied with wiping water via the plates 14, this also seeing to an elimination of charges on the compartment walls and the discharge belt in addition to an effective wiping of residual powder.

As set forth above, the discharge belt 24 is cleaned separately therefrom outside the compartment 2, namely by being subjected to an impinging air stream, i.e., powder being blown off at the discharge side of the workpieces (at the right in FIG. 1) and by being wiped off at the workpiece admission side of the compartment 2.

In order to avoid a contamination of the cleaning device by stray powder during the powder coating of the workpieces, the cleaning device 16,18,26 is always withdrawn from the compartment during the powder coating of the workpieces, whereby it can be parked outside the compartment 2 in the "parked position" according to FIG. 1. During the coating process, the compartment doors 7,9 shown in open position in FIG. 1 are then closed to such an extent that a continuous conveying of the workpieces to be coated is still possible via the remaining gap, insofar as discontinuous operation is not desired. In the latter instance, the compartment doors can be completely closed.

Figure 2:
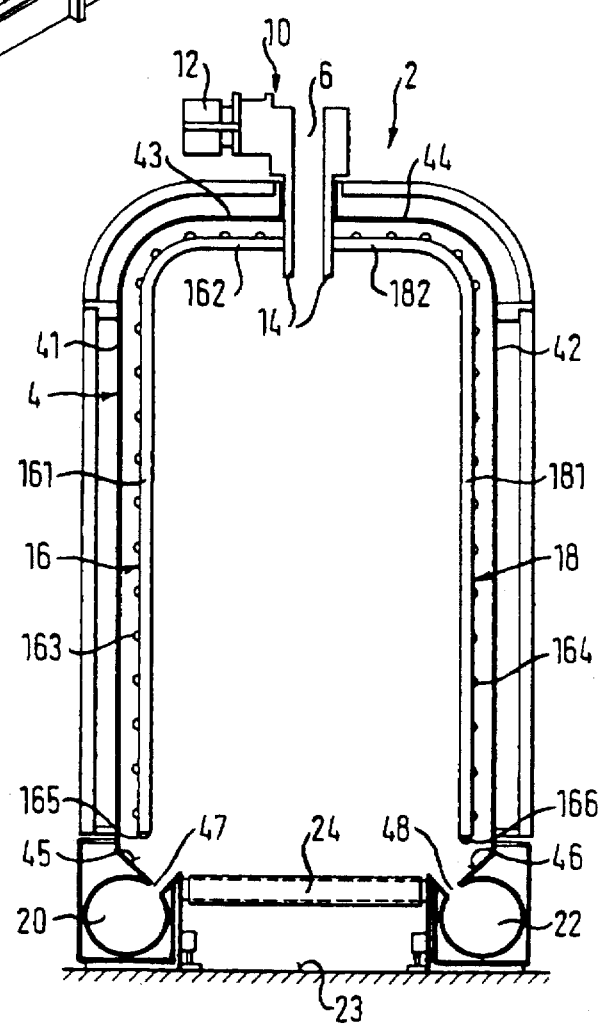
FIG. 2 is a cross section through the compartment with the cleaning device situated therein, shown at the level of the tube system.
Figure 4:
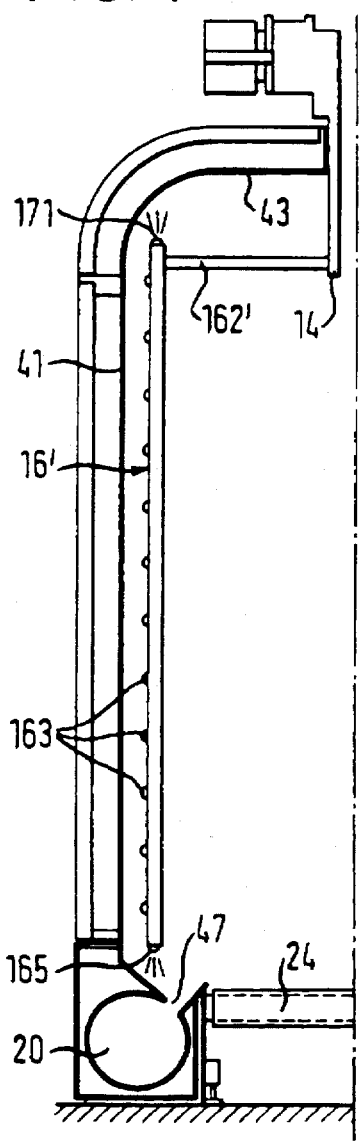
FIG. 4 is a modified tube system of the cleaning device of the invention shown in a half section in the same plane of section as FIG. 2.

The embodiment of FIG. 4 is characterized by a simplified fashioning wherein the tube branches are formed by straight line, vertical tube sections 16' that are cut from a length of tubing. These tube sections are connected to the respectively appertaining plates 14 via horizontal tube sections 162' not equipped with nozzles and which thus serve as holders and air delivery means for the vertical tube sections 16'. Vertical nozzles 171,165 at their upper and lower ends can serve the purpose of blowing powder off, on the one hand, the ceiling region 43 and, on the other hand, the slanting surface 45 of the sidewall 41. Otherwise, this embodiment is unmodified compared to that of FIG. 2 and is therefore not described in greater detail.

What all embodiments have in common is that the complete cleaning process comprises, on the one hand, a blowing process and, on the other hand, a wiping process of the inside walls of the compartment 2 including the movable floor (discharge belt 24) and, thus, leads to an effective cleaning and, at the same time, discharging of the compartment walls.

In the preferred embodiments, the discharge belt 24 is flat and can be walked on facilitating inspection and maintenance work in the compartment.

Although the present invention has been described with reference to a specific embodiment, those of skill in the art will recognize that changes may be made thereto without departing from the scope and spirit of the invention as set forth in the appended claims.

I claim as my invention:

1. A cleaning device for a powder coating compartment, the device movable through said compartment in longitudinal direction and comprises a tube system with nozzles via which cleaning air is blown against the compartment side walls, the improvement comprising:

the tube system having tube branches that extend essentially vertically and parallel to the sidewalls of said compartment and are equipped with said nozzles; and the floor of said compartment is formed by a discharge belt running in longitudinal direction of said compartment.

2. The improvement according to claim 1, further comprising a wiper frame for wiping off the sidewalls and the ceiling of said compartment.

3. The improvement according to claim 2, wherein said wiper frame comprises a wiper mechanism having water-fed sponges that are extensible from a retracted idle position into an extended operating position arranged at the circumference of the wiper frame.

4. The improvement according to claim 3, comprising conveyor means for moving said cleaning device longitudinally, and a compartment ceiling having a longitudinal slot, said conveyor means having two parallel plates within said slot, and wherein said tube branches are arranged in a common vertical plane and are fashioned inverted L-shaped and have upper, horizontal legs suspended at said two parallel plates of said conveyor means; and in that the tube branches are supplied with compressed air via a common compressed air feed and wherein said frame is fashioned in the form of a prone C, whereby the free ends of its C-legs are attached to said plates of said conveyor means.

5. The improvement according to claim 3, wherein the nozzles are actuatable during conveying through said compartment in one direction and the wiper mechanism is actuatable during conveying in the respective other direction.

6. The improvement according to claim 1, further comprising a separate cleaning device for cleaning said discharge belt, arranged outside said compartment.

7. The improvement according to claim 6, wherein the cleaning mechanism for the discharge belt comprises a nozzle arrangement for blowing the discharge belt off with compressed air at a first end of the compartment and comprises a hingeable sponge at a second end of the compartment.

8. The improvement according to claim 1, comprising slots that communicate with lateral extraction channels for recovering the blown-off powder located at both sides of said discharge belt in lower two corner regions of said compartment.

9. The improvement according to claim 8, wherein said side walls have slanting surfaces leading to the slots; and in that vertical legs of the tube branches are arranged above the slanting surfaces and are provided with nozzles directed onto the slanting surfaces.

10. The improvement according to claim 1, comprising conveyor means for moving said cleaning device longitudinally, and a compartment ceiling having a longitudinal slot, and said conveyor means having two parallel plates that extend vertically through said longitudinal slot in said compartment ceiling, and wherein said tube branches are arranged in a common vertical plane and are fashioned inverted L-shaped and have upper, horizontal legs suspended at said two parallel plates; and in that the tube branches are supplied with compressed air via a common compressed air feed.

11. A powder coating compartment, comprising:

opposing first and second side walls;

a top wall mounted on top of and between said side walls;

a bottom wall defined by a lengthwise moving conveyor belt, said side walls, top wall and bottom wall defining a space;

two tubes arranged each adjacent one of said side walls with openings directed at said respective side walls, said tubes arranged to move within said space; and means for moving said tubes lengthwise through said space; and means for introducing pressurized air into said tubes for blowing powder off said side walls by impingement of air flowing from said openings.

12. The compartment according to claim 11, wherein said tubes are inverted L-shaped with short legs parallel to said top wall and having upward openings for blowing powder off said top wall by impingement of air flowing from said upward openings.

13. The compartment according to claim 11, wherein said openings are channeled by nozzles connected to said tubes.

14. The compartment according to claim 11, further comprising a moveable wiper means for moving behind said tubes through said space for wet wiping said side walls.

15. The compartment according to claim 14, wherein said wiper means comprises a prone C shaped frame having retractable water fed sponges.

16. The compartment according to claim 15, further comprising plate means supported on a lengthwise rail above said top wall and translatable through a lengthwise slot in said top wall, said plate means for supporting said prone C shaped frame and said tubes, and driven lengthwise through said space.

17. The compartment according to claim 11, further comprising channels below said tubes for collecting powder removed from said side walls.

18. The compartment according to claim 11, further comprising a means for cleaning powder collected on said conveyor belt, said means arranged outside said space.

* * * * *